US012573557B2

(12) United States Patent
Shin et al.

(10) Patent No.: US 12,573,557 B2
(45) Date of Patent: Mar. 10, 2026

(54) MULTILAYER ELECTRONIC COMPONENT INCLUDING A PERMEATION LAYER

(71) Applicant: SAMSUNG ELECTRO-MECHANICS CO., LTD., Suwon-si (KR)

(72) Inventors: Jin Bok Shin, Suwon-si (KR); Min Soo Kim, Suwon-si (KR); Choong Seop Jeon, Suwon-si (KR); Jung Hyun An, Suwon-si (KR); Seung Yong Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 367 days.

(21) Appl. No.: 18/134,727

(22) Filed: Apr. 14, 2023

(65) Prior Publication Data

US 2024/0203648 A1    Jun. 20, 2024

(30) Foreign Application Priority Data

Dec. 15, 2022    (KR) ........................ 10-2022-0176012

(51) Int. Cl.
| | |
|---|---|
| *H01G 4/224* | (2006.01) |
| *H01G 4/12* | (2006.01) |
| *H01G 4/30* | (2006.01) |

(52) U.S. Cl.
CPC ........... *H01G 4/224* (2013.01); *H01G 4/1227* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2018/0261389 A1* | 9/2018 | Sakate | ................... H01G 4/232 |
| 2021/0020367 A1 | 1/2021 | Yun et al. | |
| 2021/0090806 A1 | 3/2021 | Park et al. | |

FOREIGN PATENT DOCUMENTS

| | | |
|---|---|---|
| KR | 10-2019-0116134 A | 10/2019 |
| KR | 10-2019-0116181 A | 10/2019 |

* cited by examiner

*Primary Examiner* — Eric W Thomas
(74) *Attorney, Agent, or Firm* — MORGAN, LEWIS & BOCKIUS LLP

(57) ABSTRACT

A multilayer electronic includes a body including a permeation layer disposed inside the body and in contact with a surface of the body, a dielectric layer, and internal electrodes and external electrodes disposed on the body, wherein an average content of subcomponent element included in the permeation layer is higher than an average content of subcomponent elements included in the dielectric layer, and an average surface roughness of the body is 0.01 nm or more and 40 nm or less.

20 Claims, 8 Drawing Sheets

FIRST
DIRECTION

SECOND
DIRECTION

THIRD
DIRECTION

FIRST
DIRECTION

SECOND
DIRECTION

I–I'

FIRST
DIRECTION

THIRD
DIRECTION   Ⅱ–Ⅱ'

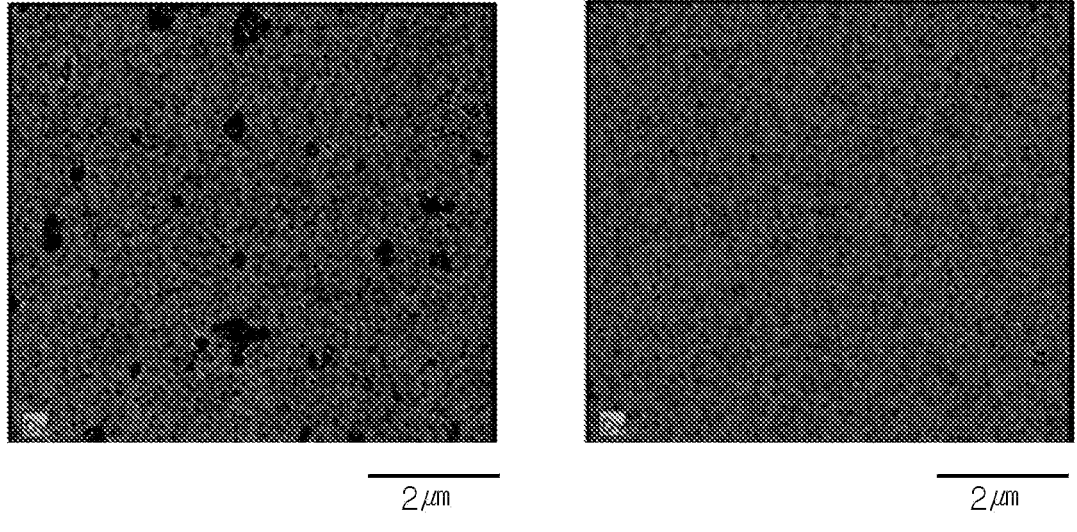
FIG. 8A                    FIG. 8B

MULTILAYER ELECTRONIC COMPONENT INCLUDING A PERMEATION LAYER

CROSS-REFERENCE TO RELATED APPLICATION

This application claims benefit of priority to Korean Patent Application No. 10-2022-0176012 filed on Dec. 15, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), a multilayer electronic component, is a chip-type capacitor mounted on the printed circuit boards of various types of electronic products, such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof, such as compactness, guaranteed high capacitance, and ease of mounting. As various electronic devices, such as computers and mobile devices have been reduced in size and increased in power, demand for miniaturization and high capacitance of MLCCs have been increased.

Meanwhile, multilayer electronic components may be exposed to various adverse environments, and in this case, the multilayer electronic components may be defective or expected lifespan thereof may be shortened due to external moisture penetration or external impacts. Therefore, various studies have been conducted to improve moisture resistance reliability or rigidity resistance.

In particular, a surface of a body of a multilayer electronic component may have fine irregularities or pores, and these irregularities may be a space in which moisture may permeate to remain and may cause moistening. In addition, when an external impact is applied to the corresponding irregularities, cracks may occur. Accordingly, irregularities or pores present on the surface of the body may act as a cause of deteriorating moisture resistance reliability or rigidity resistance of the multilayer electronic component.

SUMMARY

An aspect of the present disclosure may provide a multilayer electronic component having improved surface roughness and having improved moisture resistance reliability and rigidity resistance by minimizing the number of pores.

According to an aspect of the present disclosure, a multilayer electronic includes a body including a dielectric layer and internal electrodes and external electrodes disposed on the body, wherein the body includes a permeation layer disposed inside the body and in contact with a surface of the body, an average content of subcomponent elements included in the permeation layer is higher than an average content of subcomponent elements included in the dielectric layer.

BRIEF DESCRIPTION OF DRAWINGS

The above and other aspects, features and other advantages of the present disclosure will be more clearly understood from the following detailed description taken in conjunction with the accompanying drawings, in which:

FIGS. 8A and 8B are images obtained by mapping Dy elements on surfaces of the bodies of Comparative Example a and Example b through TEM-EDS.

DETAILED DESCRIPTION

Figure 1:
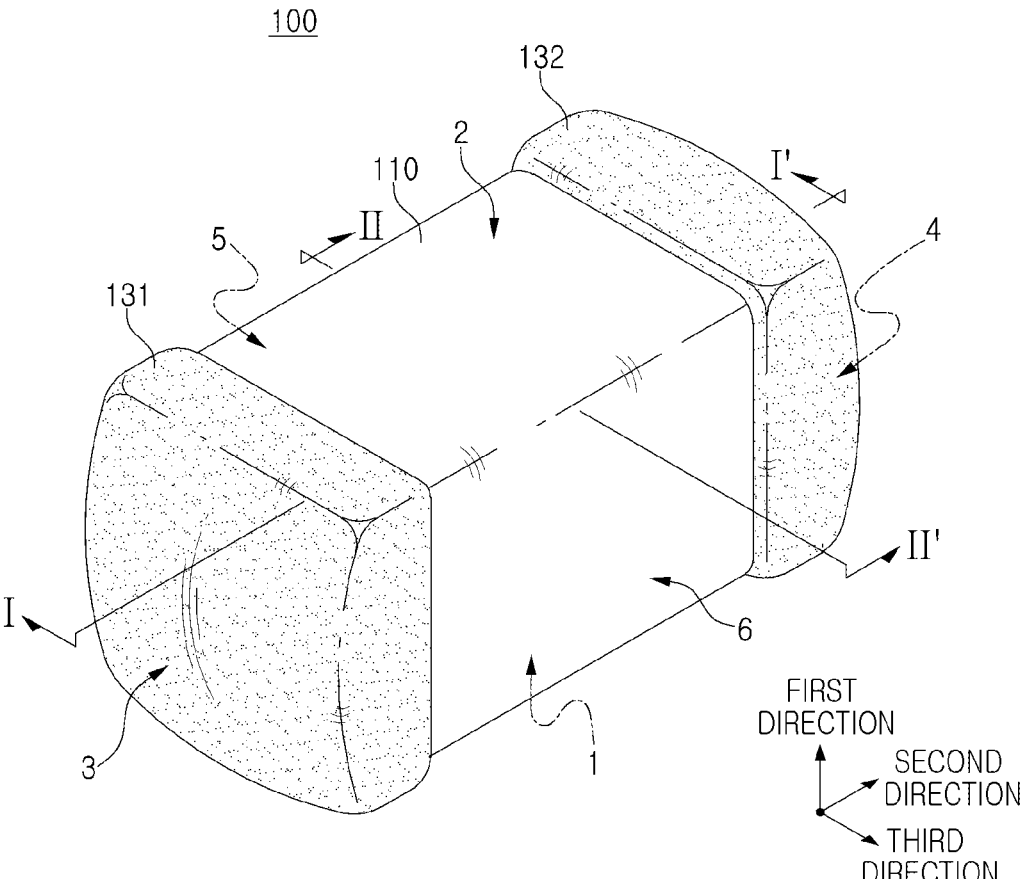
FIG. 1 is a perspective view schematically illustrating a multilayer electronic component according to an exemplary embodiment in the present disclosure.

Hereinafter, exemplary embodiments of the present disclosure will be described in detail with reference to the accompanying drawings.

In the drawings, a first direction may be defined as a stacking direction or a thickness (T) direction, a second direction may be defined as a length L direction, and a third direction may be defined as a width (W) direction.

Multilayer Electronic Component

FIG. 1 is a perspective view schematically illustrating a multilayer electronic component according to an exemplary embodiment in the present disclosure.

Figure 2:
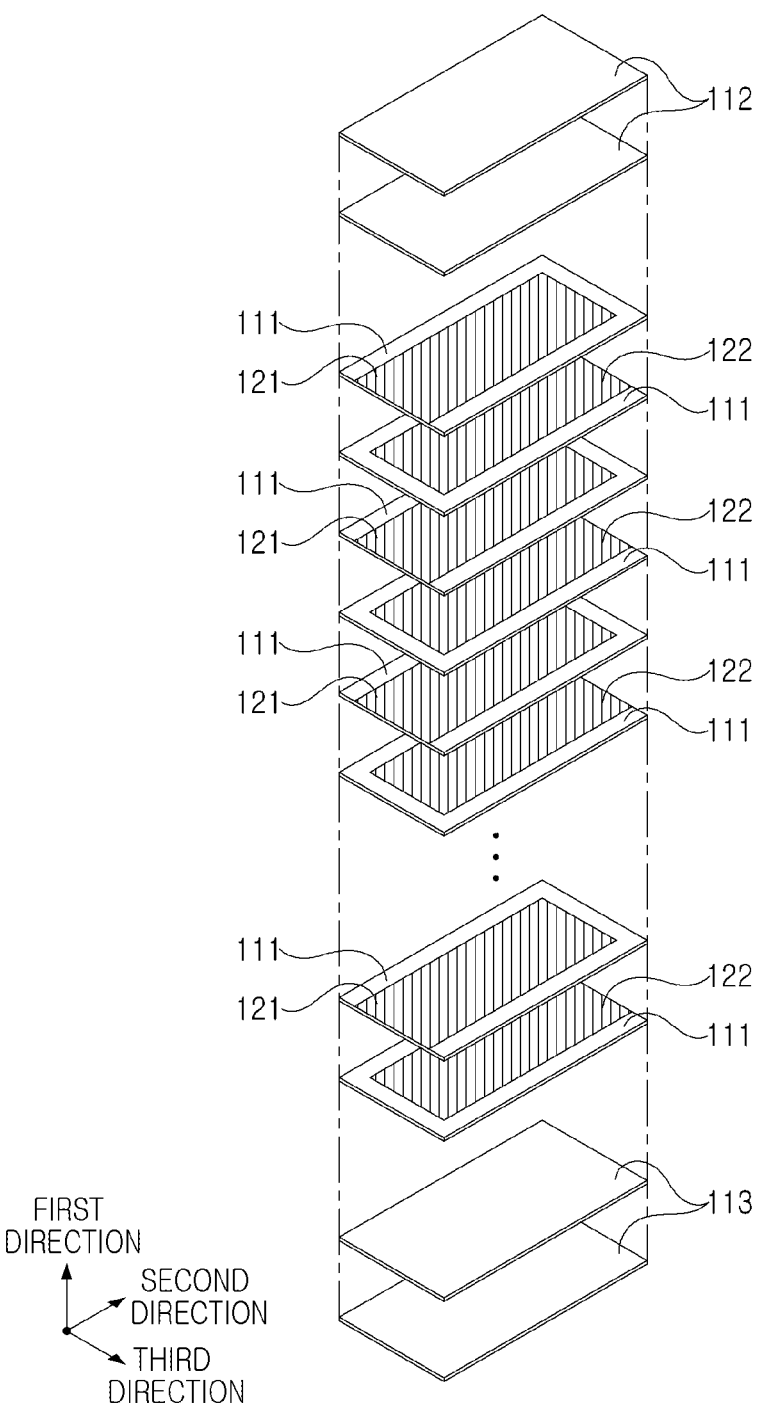
FIG. 2 is an exploded perspective view schematically illustrating a stack structure of internal electrodes of FIG. 1.

FIG. 2 is a schematic exploded perspective view illustrating a stack structure of internal electrodes of FIG. 1.

Figure 3:
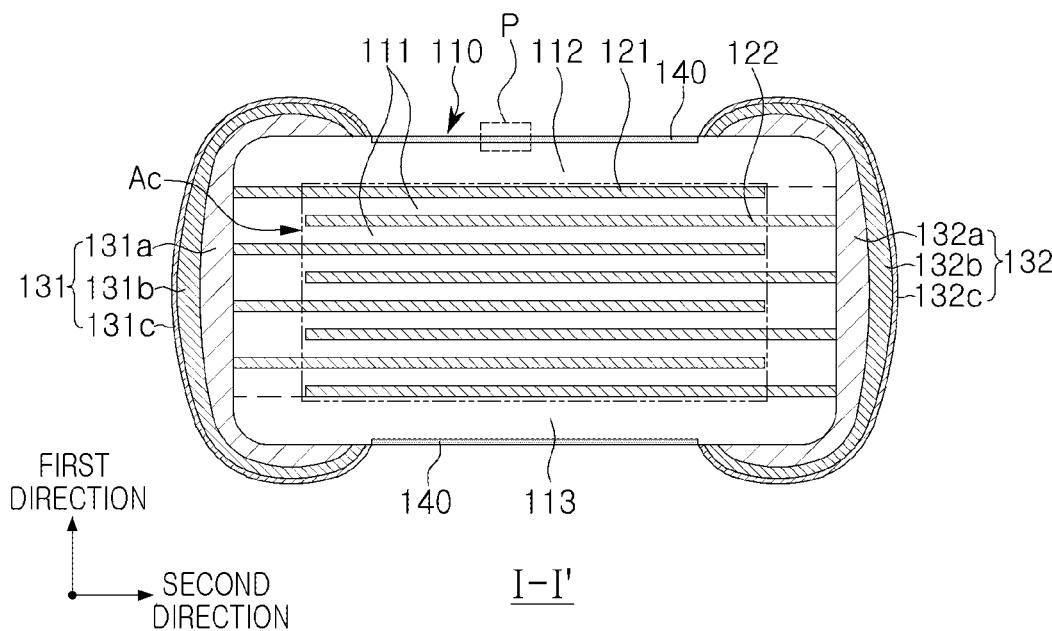
FIG. 3 is a cross-sectional view taken along line I-I' of FIG. 1.

FIG. 3 is a cross-sectional view taken along line I-I' of FIG. 1.

Figure 4:
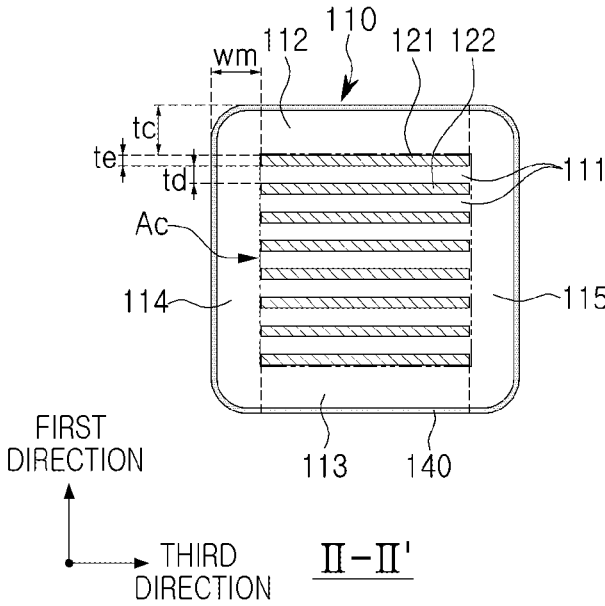
FIG. 4 is a cross-sectional view taken along line II-II' of FIG. 1.

FIG. 4 is a cross-sectional view taken along line II-II' of FIG. 1.

Figure 5:
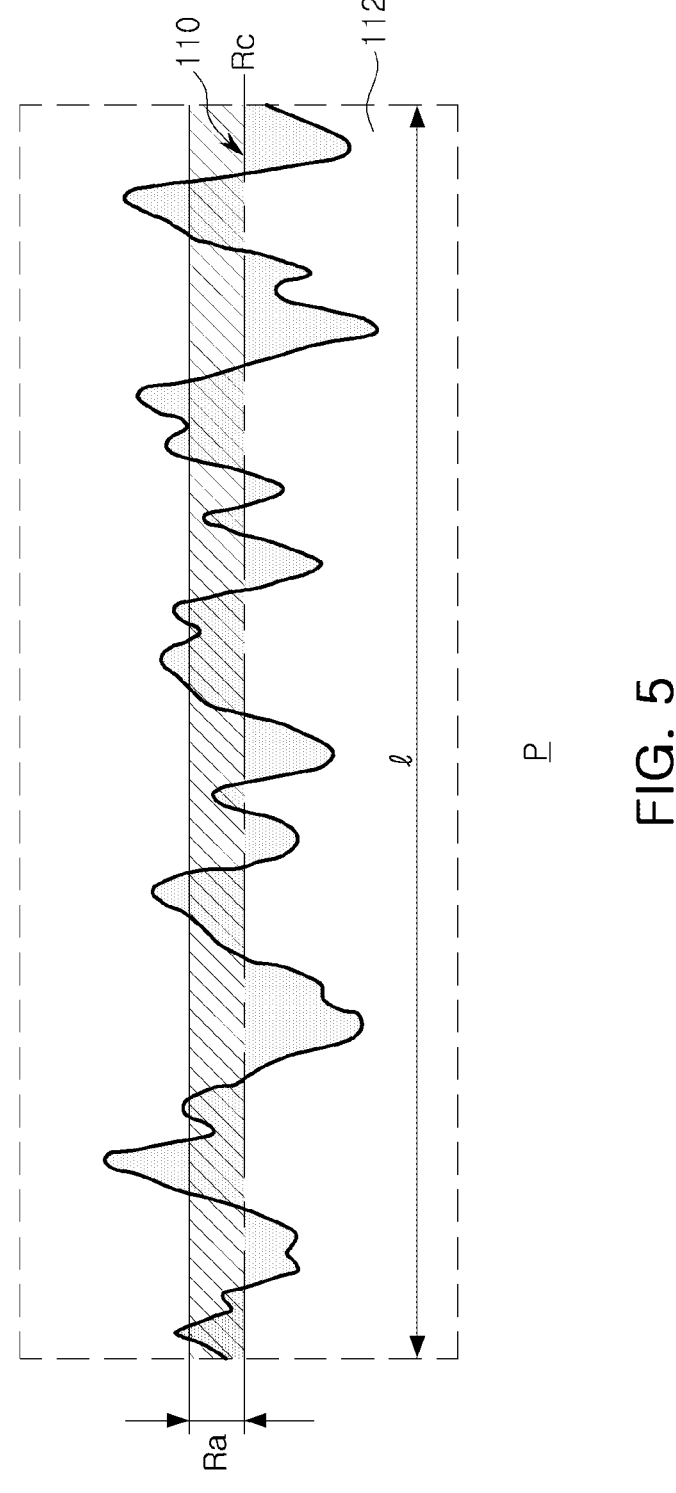
FIG. 5 is an enlarged view of region P of FIG. 3.

FIG. 5 is an enlarged view of region P of FIG. 3.

Hereinafter, a multilayer electronic component according to an exemplary embodiment in the present disclosure will be described in detail with reference to FIGS. 1 to 5. However, although a multilayer ceramic capacitor is described as an example of a multilayer electronic component, the present disclosure may also be applied to various electronic products using a dielectric composition, inductors, piezoelectric elements, varistors, or thermistors.

A multilayer electronic component 100 according to an exemplary embodiment in the present disclosure includes a body 110 including a dielectric layer 111 and internal electrodes 121 and 122 and external electrodes 131 and 132 disposed on the body 110, wherein the body 110 includes a permeation layer 140 disposed inside the body 110 and in contact with a surface of the body 110, an average content of subcomponent elements included in the permeation layer 140 is higher than an average content of subcomponent elements included in the dielectric layer 111, and an average surface roughness of the body is 0.01 nm or more and 40 nm or less.

In the body 110, the dielectric layers 111 and the internal electrodes 121 and 122 are alternately stacked.

More specifically, the body 110 may include a capacitance forming portion Ac disposed inside the body 110 and forming capacitance by including the first internal electrode 121 and the second internal electrode 122 alternately disposed to face each other with the dielectric layer 111 interposed therebetween.

Although the specific shape of the body 110 is not particularly limited, the body 110 may have a hexahedral shape or a shape similar thereto as illustrated. Due to the shrinkage of ceramic powder included in the body 110 during a sintering process, the body 110 may not have a perfectly straight hexahedral shape but may have a substantially hexahedral shape.

The body 110 may have first and second surfaces 1 and 2 facing each other in the first direction, third and fourth surfaces connected to the first and second surfaces 1 and 2 and facing each other in the second direction, and fifth and sixth surfaces 5 and 6 connected to the first to fourth surfaces 1, 2, 3, and 4 and facing each other in the third direction.

The dielectric layer 111 included in the body 110 is in a fired state, and adjacent dielectric layers 111 may be integrated such that boundaries therebetween may not be readily apparent without using a scanning electron microscope (SEM).

A raw material for forming the dielectric layer 111 is not limited as long as sufficient capacitance may be obtained. In general, a perovskite $(ABO_3)$-based material may be used, and for example, a barium titanate-based material, a lead composite perovskite-based material, or a strontium titanate-based material may be used. The barium titanate-based material may include $BaTiO_3$-based ceramic powder, and examples of the ceramic powder may include $BaTiO_3$ and $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, or $Ba(Ti_{1-y}Zr_y)O_3$ $(0<y<1)$ in which Ca, Zr, etc. Are partially dissolved in $BaTiO_3$.

In addition, as a material for forming the dielectric layer 111, various ceramic additives, organic solvents, binders, dispersants, etc. May be added to powder of barium titanate $(BaTiO_3)$ according to purposes of the present disclosure.

In order to improve the properties of the dielectric, which is the main component included in the dielectric layer 111, in various ways, a dielectric composition may be prepared by adding various additives to dielectric particles before sintering.

Hereinafter, additives that may be included in the dielectric composition will be described, and the additives may exist as subcomponents in the dielectric composition.

Here, the main component may refer to a component that occupies a relatively large weight ratio compared to other components, and may refer to a component that is 50 wt % or more based on a weight of the entire composition or the entire dielectric layer.

The subcomponent may refer to a component that occupies a relatively small weight ratio compared to other components, and may refer to a component that is less than 50 wt % based on the weight of the entire composition or the entire dielectric layer.

a) First Subcomponent

A first subcomponent including at least one of an oxide or a carbonate of a variable valence acceptor element may be further included, and the variable valence acceptor element may include one or more selected from manganese (Mn), vanadium (V), chromium (Cr), iron (Fe), nickel (Ni), cobalt (Co), copernicium (Cn), and zinc (Zn).

The variable valence acceptor element included in the first subcomponent may serve to improve sintering temperature drop and high-temperature withstand voltage characteristics of the multilayer ceramic capacitor to which the dielectric composition is applied.

b) Second Subcomponent

The dielectric composition may further include a second subcomponent including at least one of an oxide or a carbonate of magnesium (Mg).

Mg of the second subcomponent may serve to increase an RC value.

c) Third Subcomponent

The dielectric composition may further include a third subcomponent including at least one of an oxide and a carbonate of a rare earth element, and the rare earth element may include one or more selected from dysprosium (Dy), yttrium (Y), lanthanum (La), cerium (Ce), praseodymium (Pd), neodymium (Nd), samarium (Sm), europium (Eu), gadolinium (Gd), terbium (Tb), holmium (Ho), erbium (Er), thulium (Tm), ytterbium (Yb) and ruthenium (Lu).

The rare earth element included in the third subcomponent may serve to improve high-temperature withstand voltage characteristics.

d) Fourth Subcomponent

The dielectric composition may further include a fourth subcomponent including at least one of oxides and carbonates of at least one of barium (Ba), calcium (Ca), hafnium (Hf), and zirconium (Zr).

Ba and Ca included in the fourth subcomponent may serve to increase dielectric constant and RC value.

e) Fifth Subcomponent

The dielectric composition may further include a fifth subcomponent including at least one of oxides and carbonates of at least one of aluminum (Al) and silicon (Si) and glass including Si.

The fifth subcomponent is a liquid phase forming element that lowers a sintering temperature, and may affect density or moisture resistance reliability improvement by controlling sinterability through liquid phase sintering.

A thickness td of the dielectric layer 111 may not be particularly limited.

However, when high capacitance of the multilayer electronic component is intended, the thickness of the dielectric layer 111 may be 3.0 μm or less, but in order to more easily achieve miniaturization and high capacitance of the multilayer electronic component, the thickness of the dielectric layer 111 may be 1.0 μm or less, preferably, 0.6 μm or less, and more preferably, 0.4 μm or less.

Here, the thickness td of the dielectric layer 111 may refer to the thickness td of the dielectric layer 111 disposed between the first and second internal electrodes 121 and 122.

Meanwhile, the thickness td of the dielectric layer 111 may refer to a size of the dielectric layer 111 in the first direction. Also, the thickness td of the dielectric layer 111 may refer to an average thickness td of the dielectric layer 111 and may refer to an average size of the dielectric layer 111 in the first direction.

The average size of the dielectric layer 111 in the first direction may be measured by scanning an image of a cross-section of the body 110 in the first and second directions with a scanning electron microscope (SEM) having a magnification of 10,000. More specifically, the average size may be an average value obtained by measuring the sizes of one dielectric layer in the first direction at 30 equally spaced points in the second direction in the scanned image. The 30 points at equal intervals may be designated in the capacitance forming portion Ac. In addition, if the average value is measured by extending the measurement of the average value to 10 dielectric layers, the average size of the dielectric layers in the first direction may be more generalized. Other methods and/or tools appreciated by one of ordinary skill in the art, even if not described in the present disclosure, may also be used.

Meanwhile, multilayer electronic components may be exposed to various adverse environments, and in this case, the multilayer electronic components may be defective or expected lifespan thereof may be shortened due to external moisture penetration or external shock. Therefore, various researches have been conducted to improve moisture resistance reliability or rigidity resistance.

In particular, a surface of a body of a multilayer electronic component may have fine irregularities or pores, and these irregularities may be a space in which moisture may permeate to remain and may cause moistening. In addition, when an external impact is applied to the corresponding irregularities, cracks may occur. Accordingly, irregularities or pores present on the surface of the body may act as a cause of deteriorating moisture resistance reliability or rigidity resistance of the multilayer electronic component.

Therefore, in an exemplary embodiment in the present disclosure, by forming and disposing the permeation layer 140 on the surface of the body 110, there is an effect of improving moisture resistance reliability or rigidity resistance.

For example, salts of subcomponent additives present in a liquid state may be applied to the body surface of a multilayer electronic component after a sintering process in various manners, and then a heat treatment may be performed irregularities and/or pores, thereby improving to seal surface roughness and moisture resistance reliability. However, the present disclosure is not particularly limited thereto, and a liquid additive may be applied to the entire surface of the body before forming the external electrodes.

Preferably, the liquid additive may be applied to the surface of the body after the sintering process to physically fill the irregularities without affecting the electrical properties of the multilayer electronic component, thereby blocking a penetration path of moisture and increasing rigidity of the region in which the additive is applied.

As a method of applying the liquid additive, the multilayer electronic component may be dipped to an upper layer portion of a solution of a water tank in which the liquid additive is stored so that the multilayer electronic component may be wet by a predetermined depth to be coated. Alternatively, a liquid additive may be applied to the multilayer electronic component in a droplet method to impart wettability, and then may be spread to be applied. In addition, the liquid additive may be sprayed and applied on the multilayer electronic component by a spraying method, and in this case, an application area may be controlled by masking on a region to which the liquid additive is to be applied, except for an application region. However, the present disclosure is not particularly limited thereto.

When a liquid additive having excellent permeability, wettability and spreadability is applied, it is very easy to fill pores and irregularities existing on the surface of the body and the homogeneity of the application is high, so that moisture resistance reliability may be further improved.

In addition, since the liquid additive is in a liquid phase, when applied to the surface of the body, the liquid additive may not exist as a layer on the outer surface of the body but may permeate into the inside of the body, so that the thickness of the multilayer electronic component may not be greatly changed and the capacitance efficiency per volume may be better in a micro-miniature product.

At this time, the applied liquid additive may become the permeation layer 140 to be described later.

More specifically, the body 110 may include the permeation layer 140 disposed inside the body 110 and in contact with the surface of the body 110. In other words, the permeation layer 140 may be disposed on an inner surface of the body 110.

The permeation layer 140 may refer to a region within 100 nm from the surface of the body 110 in an inward direction, and the permeation layer 140 may include at least one or more of the same subcomponent elements as the subcomponent elements included in the dielectric layer 111.

In this case, an average content of the subcomponent element included in the permeation layer 140 may be higher than an average content of subcomponent element included in the dielectric layer 111 of the capacitance forming portion Ac. The average content of the subcomponent elements disclosed herein may be relative to a total amount of the subcomponent elements, Ba, Ti, O, and, if present, Ca.

That is, in the region within 100 nm from the surface of the body 110 in an inward direction, the content of the subcomponent element may be high. This may be confirmed by targeting subcomponent elements to be mapped by analyzing a cross-section of the body 110 in the first and second directions with SEM-EDS, TEM-EDS or STEM-EDS. Other methods and/or tools appreciated by one of ordinary skill in the art, even if not described in the present disclosure, may also be used.

In addition, the subcomponent element included in the permeation layer 140 may seal at least one or more of pores existing in the region within 100 nm from the surface of the body 110 in an inward direction. Accordingly, porosity of the permeation layer 140 may be smaller than that of the dielectric layer 111. Pores may be observed and measured through the cross-section of the body in the first and second directions through SEM. Other methods and/or tools appreciated by one of ordinary skill in the art, even if not described in the present disclosure, may also be used.

Also, density of the permeation layer 140 may be higher than that of the dielectric layer 111. The density of the permeation layer 140 and the dielectric layer 111 may be obtained using Rutherford Back Scattering Spectrometry and Dual Beam FIB. Other methods and/or tools appreciated by one of ordinary skill in the art, even if not described in the present disclosure, may also be used.

This may be the result of applying the liquid additive to the body surface and penetrating into the body, and the subcomponent elements may fill the surface roughness or pores, so that the density and moisture resistance reliability may be improved.

In the multilayer electronic component according to an exemplary embodiment in the present disclosure, the permeation layer 140 may be disposed in a region of the body 110 that does not contact the external electrodes 131 and 132.

For example, the permeation layer 140 may be disposed on at least one surface of the first, second, fifth and sixth surfaces of the body 110.

As described above, this is only a difference in the manufacturing process by applying the liquid additive to permeate into the surface of the externally exposed body of the multilayer electronic component after sintering, and the present disclosure is not particularly limited thereto.

The subcomponent element included in the permeation layer 140 may include at least one or more of the subcomponent elements included in the dielectric layer 111 described above.

By including subcomponent elements, which are the same as or similar to those included in the dielectric layer 111, in the permeation layer 140, compatibility and bonding with the components of the existing dielectric layer may be excellent, and side effects caused by abnormal reactions may easily controlled, so that moisture resistance reliability and rigidity may be improved more easily.

In an exemplary embodiment in the present disclosure, the average surface roughness Ra of the body 110 may be 0.01 nm or more and 40 nm or less.

When the average surface roughness Ra of the body 110 satisfies 0.01 nm or more and 40 nm or less, moisture resistance reliability may be improved, and crack occurrence may be suppressed due to excellent rigidity resistance.

A lower limit of the average surface roughness Ra of the body 110 is not particularly limited, and may be, for example, 0.01 nm or more. However, if the average surface roughness Ra of the body 110 is greater than 40 nm, moisture permeation from the outside may be facilitated to deteriorate moisture resistance reliability, and cracks may occur due to external shock or environment.

Surface roughness refers to the degree of fine irregularities formed on a surface of an object.

Surface roughness is caused by tools used for machining, suitability of machining methods, scratches on the surface, rust, etching, etc., and in indicating the degree of roughness, when a surface is cut to a plane orthogonal thereto, a cross-section thereof has a difference in height, and a height from the lowest point to the highest point may be defined as maximum surface roughness.

For example, referring to FIG. 5, as for surface roughness of the body 110, there may be a difference in height from the center line when a cross section of the body 110 in the first and second directions are observed through an SEM, which may be referred to as surface roughness. Other methods and/or tools appreciated by one of ordinary skill in the art, even if not described in the present disclosure, may also be used.

Average surface roughness Ra may refer to a value obtained by extracting only a reference length in a direction of an average line from a roughness curve obtained through a roughness measurement device, taking the X axis in the direction of the average line of the extracted portion and the Y axis in a direction of vertical magnification, obtaining a roughness curve correspondence equation f(x), and then obtaining according to Equation 1 below, and the unit may be micrometers (μm) or nanometers (nm).

$$Ra = \frac{1}{l} \int_0^l |f(x)| dx \qquad \text{[Equation 1]}$$

Referring to FIG. 5, which schematically shows the surface of the body 110 of an exemplary embodiment in the present disclosure, in another method of obtaining an average surface roughness based on the imaginary center line Rc of the surface roughness, distances (e.g., $r_1$, $r_2$, $r_3$, ... $r_n$) may be measured based on the imaginary center line Rc of surface roughness and an average value of the distances may be calculated as expressed in Equation 2 below to calculate the average surface roughness.

$$\text{Average surface roughness} = \frac{|r_1| + |r_2| + |r_3| + ... |r_n|}{n} \qquad \text{[Equation 2]}$$

In addition, the average surface roughness Ra of the body 110 may be measured by using a piezoresponse force microscope (PFM) or atomic force microscope (AFM) device.

The PFM may be used when measuring surface roughness of a ferroelectric material, and is an analysis method capable of measuring surface roughness using piezoelectric properties appearing in a local region.

More specifically, when a cantilever and a surface of a dielectric sample are approached and an AC electric field is applied, the dimension of the dielectric may be changed to cause vibration, and surface roughness may be measured by detecting such vibration. Since PFM technology may measure ferroelectricity in a nanoscale, spatial qualitative/quantitative analysis may be performed on microstructures. In addition, a polarization state and distribution of ferroelectric materials may be qualitatively and quantitatively analyzed by using PFM imaging.

The AFM is an analysis method that may obtain roughness of a sample surface and a corresponding image by using the van der Waals force acting between a probe and atoms on a surface of a dielectric sample. Surface roughness may be quantitatively measured. In particular, by scanning the surface with a fine probe and observing a surface of a nano-sized material, not only the size of particles but also surface roughness may be quantitatively known, and surface shape measurement and physical property measurement may be performed simultaneously using PFM, which is an application mode described above. Other methods and/or tools appreciated by one of ordinary skill in the art, even if not described in the present disclosure, may also be used.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

More specifically, the first internal electrode 121 may be spaced apart from the fourth surface 4 and exposed through the third surface 3, and the second internal electrode 122 may be spaced apart from the third surface 3 and may be exposed through the fourth surface 4. The first external electrode 131 may be disposed on the third surface 3 of the body 110 and connected to the first internal electrode 121, and the second external electrode 131 may be disposed on the fourth surface 4 of the body 110 and may be connected to the second internal electrode 122.

That is, the first internal electrode 121 may not be connected to the second external electrode 132 but be connected to the first external electrode 131, and the second internal electrode 122 may not be connected to the first external electrode 131 but be connected to the second external electrode 132. In this case, the first and second internal electrodes 121 and 122 may be electrically separated from each other by the dielectric layer 111 disposed therebetween.

Meanwhile, the body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen printing method or a gravure printing method, but the present disclosure is not limited thereto.

Meanwhile, a thickness te of the internal electrodes 121 and 122 may not be particularly limited.

However, when high capacitance of the multilayer electronic component is intended, the thickness of the internal electrodes 121 and 122 may be 1 μm or less, but in order to more easily achieve miniaturization and high capacitance of the multilayer electronic component, the thickness of the internal electrodes 121 and 122 may be 1.0 μm or less, preferably, 0.6 μm or less, and more preferably, 0.4 μm or less.

Here, the thickness te of the internal electrodes 121 and 122 may refer to a size of the internal electrodes 121 and 122 in the first direction. In addition, the thickness te of the internal electrodes 121 and 122 may refer to an average thickness te of the internal electrodes 121 and 122, and may refer to an average size of the internal electrodes 121 and 122 in the first direction.

The average size of the internal electrodes 121 and 122 in the first direction may be measured by scanning an image of a cross-section of the body 110 in the first and second directions with a scanning electron microscope (SEM) having a magnification of 10,000. More specifically, the average size may be an average value obtained by measuring the sizes of one internal electrode 121 or 122 in the first direction at 30 equally spaced points in the second direction in the scanned image. The 30 equally spaced points may be designated in the capacitance forming unit Ac. In addition, when the average value is measured by extending the average value measurement to 10 internal electrodes 121 and 122, the average size of the internal electrodes 121 and 122 in the first direction may be more generalized. Other methods and/or tools appreciated by one of ordinary skill in the art, even if not described in the present disclosure, may also be used.

Meanwhile, in an exemplary embodiment in the present disclosure, the thickness td of the dielectric layer 111 and the thickness te of the internal electrodes 121 and 122 may satisfy td>2×te.

In other words, the thickness td of the dielectric layer 111 may be greater than twice the thickness te of the internal electrodes 121 and 122.

In general, a reliability problem caused by a decrease in breakdown voltage (in a high-voltage environment is a major issue in electronic components for high-voltage electric devices.

Accordingly, in order to prevent a decrease in breakdown voltage under a high-voltage environment, the thickness td of the dielectric layer 111 is adjusted to be larger than twice the thickness te of the internal electrodes 121 and 122, thereby increasing the thickness of the dielectric layer, which is a distance between the internal electrodes and improve the breakdown voltage characteristics.

If the thickness td of the dielectric layer 111 is less than twice the thickness te of the internal electrodes 121 and 122, the thickness of the dielectric layer, which is the distance between the internal electrodes, is thin and the breakdown voltage may be reduced.

In the high-voltage electronic component, the thickness te of the internal electrode may be 1.0 μm or less, and the thickness td of the dielectric layer may be 3.0 μm or less, but is not necessarily limited thereto.

Meanwhile, the body 110 may include cover portions 112 and 113 disposed on both end surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer 111 or two or more dielectric layers 111 on the upper and lower surfaces of the capacitance forming portion Ac in the first direction, respectively, and may serve to prevent damage to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate (BaTiO₃)-based ceramic material.

Meanwhile, the thickness tc of the cover portions 112 and 113 may not be particularly limited.

However, in order to more easily achieve miniaturization and high capacitance of the multilayer electronic component, a thickness tc of the cover portions 112 and 113 may be 100 μm or less, preferably, 30 μm or less, and more preferably, 20 μm or less in micro-miniature products.

Here, the thickness tc of the cover portions 112 and 113 may refer to a size of the cover portions 112 and 113 in the first direction. In addition, the thickness tc of the cover portions 112 and 113 may refer to an average thickness tc of the cover portions 112 and 113, and may refer to an average size of the cover portions 112 and 113 in the first direction.

The average size of the cover portions 112 and 113 in the first direction may be measured by scanning an image of a cross-section of the body 110 in the first and second directions with a scanning electron microscope (SEM) having a magnification of 10,000. More specifically, the average size may be an average value obtained by measuring the cover portion in the first direction at 30 equally spaced points in the second direction in the scanned image. Other methods and/or tools appreciated by one of ordinary skill in the art, even if not described in the present disclosure, may also be used.

Meanwhile, the multilayer electronic component 100 may include a first side margin portions 114 and 115 disposed on both end surfaces of the body 110 in the third direction.

More specifically, the side margin portions 114 and 115 may include a first side margin portion 114 disposed on the fifth surface 5 of the body 110 and a second side margin portion 115 disposed on the sixth surface 6 of the body 110.

As illustrated, the side margin portions 114 and 115 may refer to a region between both end surfaces of the first and second internal electrodes 121 and 122 in the third direction and a boundary surface of the body 110 based on the cross-section of the body 110 in the first and third directions.

The side margin portions 114 and 115 may be formed by forming the internal electrodes 121 and 122 by applying conductive paste on the ceramic green sheet applied to the capacitance forming portion Ac, except for a region in which the side margin portions 114 and 115 are to be formed, cutting so that the internal electrodes 121 and 122 are exposed to the fifth and sixth surfaces 5 and 6 of the body 110 after stacking to suppress a step difference due to the internal electrodes 121 and 122, and then stacking a single dielectric layer 111 or two or more dielectric layers 111 in the third direction on both end surfaces of the capacitance forming portion Ac in the third direction.

The side margin portions 114 and 115 may basically serve to prevent damage to the internal electrodes 121 and 122 due to physical or chemical stress.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate (BaTiO$_3$)-based ceramic material.

In an exemplary embodiment in the present disclosure, the side margin portions 114 and 115 may include the permeation layer 140 in contact with the surface of the side margin portions 114 and 115 and further disposed inside the side margin portions 114 and 115.

That is, the permeation layer 140 disposed on the inner surface of the body 110 and the permeation layer 140 disposed on the inner surfaces of the side margin portions 114 and 115 may be the same.

Thus, same the contents as those of the permeation layer 140 of the body 110 described above is duplicated and will be omitted.

More specifically, the first side margin portion 114 may include the permeation layer 140 in a region within 100 nm from the surface of the first side margin portion 114 in an inward direction (the second direction), and in this case, the permeation layer 140 may include a subcomponent element which is the same as the subcomponent element of the dielectric layer 111, and an average content of the subcomponent element included in the permeation layer 140 of the first side margin portion 114 may be higher than an average content of the subcomponent element included in the dielectric layer 111. In addition, the average surface roughness Ra of the first side margin portion 114 may be 0.01 nm or more and 40 nm or less, and when the numerical range is satisfied, the moisture resistance reliability of the multilayer electronic component may be improved.

Also, the second side margin portion 115 may include the permeation layer 140 in a region within 100 nm from the surface of the second side margin portion 115 in an inward direction (the second direction), and in this case, the permeation layer 140 may include a subcomponent element which is the same as the subcomponent element of the dielectric layer 111, and an average content of the subcomponent element included in the permeation layer 140 included in the second side margin portion 114 may be higher than an average content of the subcomponent element included in the dielectric layer 111. In addition, the average surface roughness Ra of the second side margin portion 115 may be 0.01 nm or more and 40 nm or less, and when the numerical range is moisture satisfied, resistance reliability of the multilayer electronic component may be improved.

Meanwhile, a width wm of the first and second side margin portions 114 and 115 may not be particularly limited.

However, in order to more easily achieve miniaturization and high capacitance of the multilayer electronic component 100, the width wm of the first and second side margin portions 114 and 115 may be 100 μm or less, preferably, 30 μm or less, and more preferably, 20 μm or less in ultra-small products.

Here, the width wm of the side margin portions 114 and 115 may refer to a size of the side margin portions 114 and 115 in the third direction. Also, the width wm of the side margin portions 114 and 115 may refer to an average width wm of the side margin portions 114 and 115, and may refer to an average size of the side margin portions 114 and 115 in the third direction.

The average size of the side margin portions 114 and 115 in the third direction may be measured by scanning an image of a cross-section of the body 110 in the first and third directions with a scanning electron microscope (SEM) having a magnification of 10,000. More specifically, the average size may be an average value obtained by measuring the sizes of the side margin portion in the third direction at 30 equally spaced points in the first direction in the scanned image. Other methods and/or tools appreciated by one of ordinary skill in the art, even if not described in the present disclosure, may also be used.

Although a structure in which the ceramic electronic component 100 includes two external electrodes 131 and 132 is described in an exemplary embodiment in the present disclosure, the number and shape of the external electrodes 131 and 132 may vary according to the shape of the internal electrodes 121 and 122 or other purposes.

The external electrodes 131 and 132 may be disposed on the body 110 and connected to the internal electrodes 121 and 122.

More specifically, the external electrodes 131 and 132 may be include first and second external electrodes 131 and 132 disposed on the third and fourth surfaces 3 and 4 of the body 110, respectively, and connected to the first and second internal electrodes 121 and 122, respectively. That is, the first external electrode 131 may be disposed on the third surface 3 of the body and connected to the first internal electrode 121, and the second external electrode 132 may be disposed on the fourth surface 4 of the body and may be connected to the second internal electrode 122.

Meanwhile, the external electrodes 131 and 132 may be formed using any material having electrical conductivity, such as metal, and a specific material may be determined in consideration of electrical characteristics, structural stability, and the like, or may have a multilayer structure.

For example, the external electrodes 131 and 132 may include electrode layers 131a, 132a, 131b, and 132b disposed on the body 110 and plating layers 131*c* and 132*c* disposed on the electrode layers 131*a*, 132*a*, 131*b*, and 132*b*.

As a more specific example of the electrode layers 131*a*, 132*a*, 131*b*, and 132*b*, the electrode layers 131*a*, 132*a*, 131*b*, and 132*b* may be fired electrodes formed of conductive metal and glass or resin-based electrodes formed of conductive metal and resin.

In addition, the electrode layers 131*a*, 132*a*, 131*b*, and 132*b* may have a form in which a fired electrode and a resin-based electrode are sequentially formed on the body 110.

In addition, the electrode layers 131*a*, 132*a*, 131*b*, and 132*b* may be formed by transferring a sheet including a conductive metal onto the body or by transferring a sheet including a conductive metal onto a fired electrode.

A material having excellent electrical conductivity may be used as the conductive metal included in the electrode layers 131*a*, 132*a*, 131*b*, and 132*b*. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof, but is not particularly limited thereto.

In an exemplary embodiment in the present disclosure, the electrode layers 131*a*, 132*a*, 131*b*, and 132*b* may have a two-layer structure including first electrode layers 131*a* and 132*a* and second electrode layers 131*b* and 132*b*, and thus, the external electrodes 131 and 132 may include first electrode layers 131*a* and 132*a* including conductive metal and glass and the second electrode layer 131*b* and 132*b* disposed on the first electrode layers 131*a* and 132*a* and including the conductive metal and a resin.

The first electrode layers 131*a* and 132*a* may serve to improve bonding with the body 110 by including glass, and the second electrode layers 131*b* and 132*b* may serve to improve bending strength by including a resin.

The conductive metal used in the electrode layers 131*a* and 132*a* is not particularly limited as long as it is a material that may be electrically connected to the internal electrodes 121 and 122 to form capacitance, and examples thereof may include one or more selected from the group consisting of nickel (Ni) and copper (Cu), palladium (Pd), silver (Ag), gold (Au), platinum (Pt), tin (Sn), tungsten (W), titanium (Ti), and alloys thereof. The electrode layers 131*a* and 132*a* may be formed by applying a conductive paste prepared by adding glass frit to the conductive metal powder and then sintering it.

The conductive metal included in the second electrode layers 131*b* and 132*b* may serve to electrically connect the second electrode layers 131*b* and 132*b* to the first electrode layers 131*a* and 132*a*.

The conductive metal included in the second electrode layers 131*b* and 132*b* may not be particularly limited as long as it is a material that may be electrically connected to the electrode layers 131*a* and 132*a*, and may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the second electrode layers 131*b* and 132*b* may include at least one of spherical particles and flake particles. That is, the conductive metal may include only flake particles, only spherical particles, or may be a mixture of flake particles and spherical particles. Here, the spherical particle may include a shape that is not perfectly spherical, and may include a shape in which, for example, a length ratio (major axis/minor axis) of the minor axis to the major axis is 1.45 or less. The flake particles may refer to particles having a flat and elongated shape and may have a length ratio (major axis/minor axis) of the minor axis to the major axis as 1.95 or more, but is not limited thereto. The lengths of the major and minor axes of the spherical particles and the flake particles may be measured from an image obtained by scanning a cross-section of a ceramic electronic component in the first and second directions cut at ½ points in the third direction of the ceramic electronic component with a scanning electron microscope (SEM). Other methods and/or tools appreciated by one of ordinary skill in the art, even if not described in the present disclosure, may also be used.

The resin included in the second electrode layers 131*b* and 132*b* serves to secure bonding and absorb shock. The resin included in the second electrode layers 131*b* and 132*b* is not particularly limited as long as it has bondability and shock absorption and may be mixed with conductive metal powder to form a paste, and may include, for example, an epoxy resin.

In addition, the second electrode layers 131*b* and 132*b* may include a plurality of metal particles, an intermetallic compound, and a resin. As the intermetallic compound is included, electrical connectivity with the first electrode layers 131*a* and 132*a* may be further improved. The intermetallic compound may serve to improve electrical connectivity by connecting a plurality of metal particles, and may serve to surround and connect the plurality of metal particles to each other.

In this case, the intermetallic compound may include a metal having a melting point lower than a curing temperature of the resin. That is, since the intermetallic compound includes a metal having a melting point lower than the curing temperature of the resin, the metal having a melting point lower than the curing temperature of the resin may be melted during a drying and curing process and form an intermetallic compound with some of the metal particles to enclose the metal particles. In this case, the intermetallic compound may preferably include a metal having a low melting point of 300° C. or less.

For example, the intermetallic compound may include tin (Sn) having a melting point of 213 to 220° C. During the drying and curing process, Sn may be melted, and the molten Sn may wet high-melting-point metal particles, such as Ag, Ni, or Cu, by a capillary phenomenon, and react with some of the Ag, Ni, or Cu metal particles to form an intermetallic compound, such as $Ag_3Sn$, $Ni_3Sn_4$, $Cu_6Sn_5$, and $Cu_3Sn$. Ag, Ni, or Cu that did not participate in the reaction remains in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$, and $Cu_3Sn$.

The plating layers 131*c* and 132*c* serve to improve mounting characteristics.

The type of the plating layers 131*c* and 132*c* is not particularly limited, and may be a single plating layer 131*c* or 132*c* including at least one of nickel (Ni), tin (Sn), palladium (Pd), and alloys thereof, or may be formed of a plurality of layers.

For a more specific example of the plating layers 131*c* and 132*c*, the plating layers 131*c* and 132*c* may be Ni plating layers or Sn plating layers, and may have a form in which a Ni plating layer and an Sn plating layer are sequentially formed on the electrode layers 131*a*, 132*a*, 131*b*, and 132*b* or may have a form in which a Sn plating layer, a Ni plating layer, and a Sn plating layer are sequentially formed. In addition, the plating layers 131c and 132c may include a plurality of Ni plating layers and/or a plurality of Sn plating layers.

Hereinafter, the present disclosure will be described in more detail through examples, but this is to help a detailed understanding of the disclosure, and the scope of the present disclosure is not limited by the examples.

EXAMPLES

Table 1 below shows data of evaluation of moisture resistance reliability of sample chips of Comparative Examples and Examples.

Comparative Example 1 corresponds to a sample chip in which no additive was formed on the surface of the body.

Comparative Example 2 corresponds to a sample chip in which a Dy oxide coating layer was formed on the surface of the body.

Example 1 corresponds to a sample chip in which a permeation layer was formed by applying a Dy liquid additive to the surface of the body.

40 samples of each of Comparative Example 1, Comparative Example 2, and Example 1 were prepared and fired at temperatures of 1100° C., 1150° C., and 1200° C. to manufacture sample chips.

Evaluation of moisture resistance reliability was conducted for 1 hour at a temperature condition of 85° C., relative humidity of 85%, and voltage condition of 1.5 Vr.

At this time, a case in which even one of the 40 sample chips had a short circuit of insulation resistance IR compared to initial insulation resistance IR0 was described as "X", and a case in which the short circuit of the insulation resistance did not occur (0) was described as "○".

TABLE 1

| Sintering Temperature | Test Example | Moisture Resistance Reliability |
|---|---|---|
| 1100° C. | Comparative Example 1-1 | X |
| | Comparative Example 2-1 | X |
| | Example 1-1 | ○ |
| 1150° C. | Comparative Example 1-2 | X |
| | Comparative Example 2-2 | X |
| | Example 1-2 | ○ |
| 1200° C. | Comparative Example 1-3 | X |
| | Comparative Example 2-3 | X |
| | Example 1-3 | ○ |

In the case of Comparative Example 1-1 to Comparative Example 1-3 in which no additives were applied to the surface of the body, inferior results were shown in the evaluation of moisture resistance reliability, regardless of the sintering temperature, and in the case of Comparative Example 2-1 to Comparative Example 2-3 in which the Dy oxide coating layer was formed on the surface of the body, inferior results were exhibited in the evaluation of moisture resistance reliability, regardless of the sintering 10 temperature. Meanwhile, it can be seen that, in the case of Examples 1-1 to 1-3 in which the permeation layer was formed by applying a Dy liquid additive to the surface of the body, the insulation resistance did not decrease in the evaluation of moisture resistance reliability regardless of the sintering temperature and the moisture resistance reliability was improved.

Hereinafter, Comparative Examples and Examples will be described with reference to FIGS. 6 to 8.

Figure 6A:
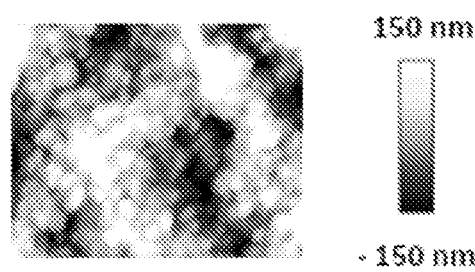
FIGS. 6A, 6B, and 6C are images obtained by analyzing surface roughness of bodies of Comparative Examples a and b and Example c with piezoresponse force microscope (PFM) equipment.
Figure 6B:
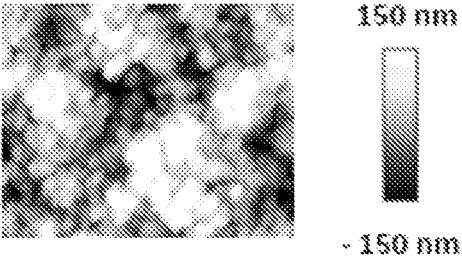
Figure 6C:
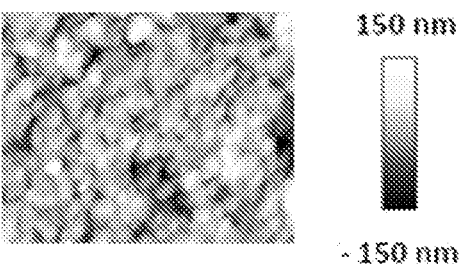

FIGS. 6A, 6B, and 6C are images obtained by analyzing surfaces of bodies of Comparative Examples and Examples of a multilayer electronic component fired at a temperature of 1100° C. through PFM analysis, and more specifically, FIG. 6A is Comparative Example 3 in which no additive was applied to the surface of the body, FIG. 6B is Comparative Example 4 in which an oxide coating layer of Dy was applied to the surface of the body, and FIG. 6C is Example 2 in which a permeation layer was formed by applying a Dy liquid additive to the surface of the body.

Referring to the reference image showing surface roughness at a depth of −150 nm to +150 nm from the central line (0 nm) as a reference, it can be seen that FIG. 6A of Comparative Example 3 and FIG. 6B of Comparative Example 4 have relatively large surface roughness compared to surface roughness of FIG. 6C which is Example 2. That is, in FIGS. 6A and 6B, it can be seen that there are many regions close to the light or shade of +150 nm or −150 nm, respectively, and in FIG. 6C, which is Example, it can be seen that many regions are distributed to be close to the light and shade of the center line (0 nm).

Figure 7A:
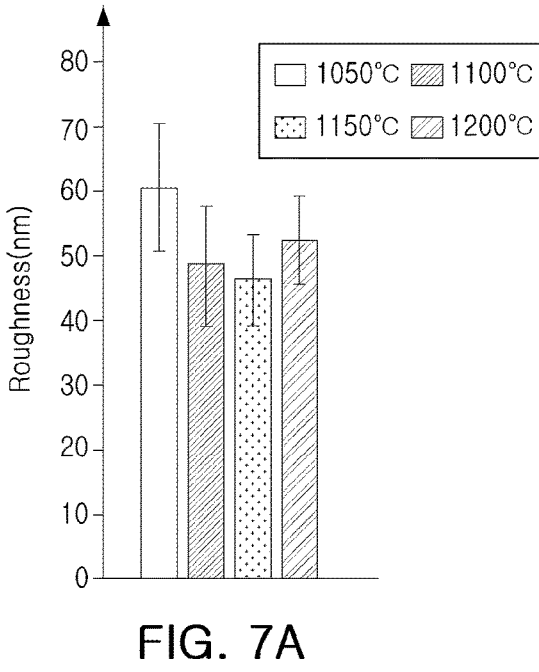
FIGS. 7A, 7B, and 7C are surface roughness values of bodies of Comparative Examples a and b and Example c measured with atomic force microscope (AFM) equipment.
Figure 7B:
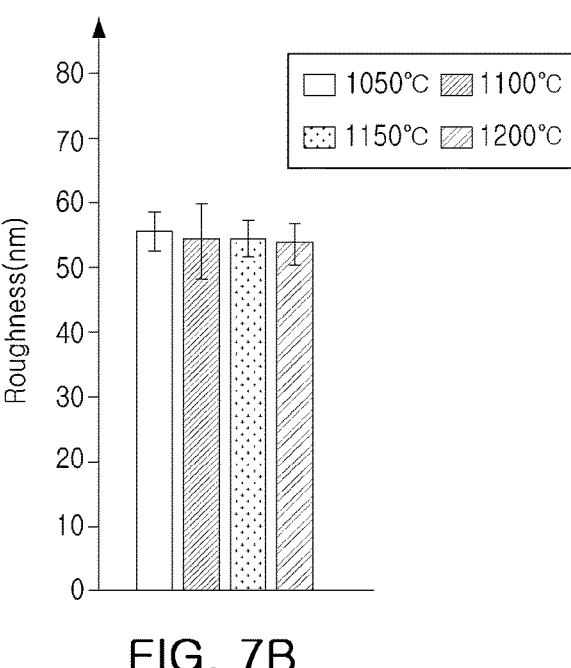
Figure 7C:
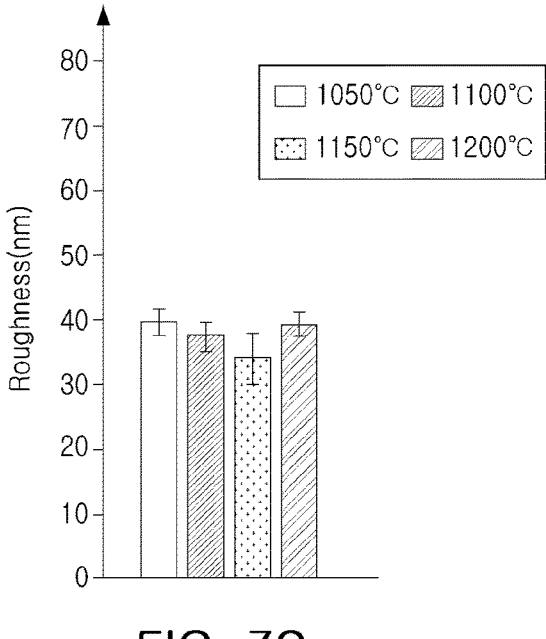

FIGS. 7A, 7B, and 7C are graphs of surface roughness obtained by quantitatively measuring the surfaces of bodies of Comparative Examples and Examples of multilayer electronic components fired at temperatures of 1050° C., 1100° C., 1150° C., and 1200° C. through AFM analysis. The bar graph refers to average surface roughness, and the 'I' straight line refers to the surface roughness distribution.

More specifically, FIG. 7A shows Comparative Example 5-1 (1050° C.), Comparative Example 5-2 (1100° C.), Comparative Example 5-3 (1150° C.), and Comparative Example 5-4 (1200° C.) in which no additive was applied to the surface of the body, FIG. 7B shows Comparative Examples 6-1 to 6-4 (the same temperature as that of Comparative Examples 5-1 to 5-4) in which an oxide coating layer of Dy was applied to the surface of the body, and FIG. 7C shows Examples 3-1 to 3-4 (the same temperature as that of Comparative Example 5-1 to Comparative Example 5-4) in which the permeation layer was formed by applying a Dy liquid additive to the surface of the body.

In the case of Comparative Examples 5-1 to 5-4 and Comparative Examples 6-1 to 6-4, there may be some differences in the average surface roughness and surface roughness distribution depending on the sintering temperature, but it can be seen that the surface roughness value is larger than that of in Examples 3-1 to 3-4.

Referring to FIGS. 7A and 7B, it can be seen that the average surface roughness exceeds 40 nm in the surface roughness of the region within 100 nm from the surface of the body in the inward direction, whereas in FIG. 7C, it can be seen that the average surface roughness is 40 nm or less in the surface roughness of the region within 100 nm from the surface of the body in the inward direction.

Accordingly, it can be seen that the surface roughness is improved by the permeation layer formed by the application of the liquid additive, so that the fine irregularities are smooth or are not deep and it may be estimated that the moisture resistance reliability and rigidity resistance are improved.

FIGS. 8A and 8B are images of the surfaces of the bodies of Comparative Examples and Examples of the multilayer electronic component mapped with Dy elements through a transmission electron microscope-energy dispersive X-ray spectrometer (TEM-EDS).

More specifically, FIG. 8A is Comparative Example 7 in which the surface of the body to which no additives were applied is mapped with Dy elements, and FIG. 8B is Example 4 in which the surface of the body on which the permeation layer was formed by applying the liquid additive is mapped with Dy elements.

Referring to FIG. 8A, which is Comparative Example 7, it can be seen that Dy was detected during mapping due to the Dy subcomponent added to the dielectric, but there are regions (black) in which Dy was not partially mapped, and thus, it is confirmed that the density of Dy is relatively low.

Meanwhile, referring to FIG. 8B, which is Example 4, it can be seen that there is little or no region in which Dy was not partially mapped due to the influence of the permeation layer formed by the application of the liquid additive in addition to the Dy subcomponent added to the dielectric layer. More specifically, it can be seen that the region to which Dy was mapped may be 90% or more, preferably, 95% or more, and more preferably, 99% or more in the 8 $\mu m \times 8$ $\mu m$ TEM-EDS image. Therefore, it can be estimated that the Dy permeation layer was formed and the moisture resistance reliability was improved. In some embodiments of the application, a region in which a rare earth element may be present may be 95% or more of the surface of the body in which the permeation layer is disposed.

One of the various effects of the present disclosure is to improve moisture resistance reliability and rigidity resistance of multilayer electronic components.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including:
a permeation layer disposed inside the body and in contact with a surface of the body,
a dielectric layer, and
internal electrodes; and
external electrodes disposed on the body,
wherein
an average content of subcomponent element included in the permeation layer is higher than an average content of subcomponent elements included in the dielectric layer,
an average surface roughness of the body is 0.01 nm or more and 40 nm or less, and
in a stacking direction of the internal electrodes, the permeation layer overlaps the internal electrodes.

2. The multilayer electronic component of claim 1, wherein the permeation layer is a region within 100 nm from the surface of the body in an inward direction.

3. The multilayer electronic component of claim 1, wherein the permeation layer is disposed in a region not in contact with the external electrode.

4. The multilayer electronic component of claim 1, wherein, on the surface of the body in which the permeation layer is disposed, a region in which a rare earth element is present is 95% or more.

5. The multilayer electronic component of claim 1, wherein the body includes:
a capacitance forming portion including the dielectric layer and the internal electrodes alternately disposed with the dielectric layer, and
a cover portion disposed above and below the capacitance forming portion, respectively.

6. The multilayer electronic component of claim 1, wherein the body includes first and second surfaces facing each other in a first direction, third and fourth surfaces connected to the first and second surfaces and facing each other in a second direction, and fifth and sixth surfaces connected to the first to fourth surfaces facing each other in a third direction, and includes a side margin portion disposed on each of the fifth and sixth surfaces of the body, and
the permeation layer is in contact with a surface of the side margin portion and is disposed inside the side margin portion.

7. The multilayer electronic component of claim 6, wherein an average surface roughness of the side margin portion is 0.01 nm or more and 40 nm or less.

8. The multilayer electronic component of claim 6, wherein the permeation layer included in the side margin portion is a region within 100 nm from the surface of the side margin portion in an inward direction.

9. The multilayer electronic component of claim 1, wherein the subcomponent element included in the permeation layer includes at least one subcomponent element among the subcomponent elements included in the dielectric layer.

10. The multilayer electronic component of claim 1, wherein
the subcomponent elements included in the dielectric layer include a rare earth element, and
the rare earth element includes at least one selected from dysprosium (Dy), yttrium (Y), lanthanum (La), cerium (Ce), praseodymium (Pd), neodymium (Nd), samarium (Sm), europium (Eu), gadolinium (Gd), terbium (Tb), holmium (Ho), erbium (Er), thulium (Tm), ytterbium (Yb), and ruthenium (Lu).

11. The multilayer electronic component of claim 1, wherein the subcomponent elements included in the dielectric layer include at least one selected from manganese (Mn), magnesium (Mg), calcium (Ca), aluminum (Al), vanadium (V), and zirconium (Zr).

12. The multilayer electronic component of claim 1, wherein the subcomponent element in the permeation layer seals at least one of pores existing in a region within 100 nm from the surface of the body in an inward direction.

13. The multilayer electronic component of claim 1, wherein porosity of the permeation layer is smaller than porosity of the dielectric layer.

14. The multilayer electronic component of claim 1, wherein density of the permeation layer is higher than that of the dielectric layer.

15. The multilayer electronic component of claim 1, wherein $2 \times te < td$, in which td is an average thickness of the dielectric layer and te is an average thickness of at least one of the internal electrodes.

16. The multilayer electronic component of claim 1, wherein the external electrodes include a first electrode layer disposed on the body and including a first conductive metal and glass connected to the internal electrodes, and a second electrode layer disposed on the first electrode layer and including a second conductive metal and a resin.

17. The multilayer electronic component of claim 1, wherein the subcomponent element included in the permeation layer includes dysprosium (Dy).

18. The multilayer electronic component of claim 17, wherein the subcomponent element included in the permeation layer further includes manganese (Mn).

19. A method to manufacture the multilayer electronic component of claim 1, comprising:

applying a liquid additive containing the subcomponent element to the body to form the permeation layer.

20. The method of claim 19, further comprising:

after the application of the liquid additive, heating the body including the applied liquid additive.

* * * * *